// United States Patent [15] 3,658,531
Kurtz [45] Apr. 25, 1972

[54] METHOD OF MAKING FLEXIBLE PRINTING PLATES

[72] Inventor: Donald M. Kurtz, Akron, Ohio

[73] Assignee: The B. F. Goodrich Company, New York, N.Y.

[22] Filed: Oct. 29, 1970

[21] Appl. No.: 85,256

[52] U.S. Cl. ............................... 96/36.3, 96/35.1, 96/115 P, 260/77.5 AM
[51] Int. Cl. ........................................ G03c 5/00, G03f 7/00
[58] Field of Search ............................ 96/35.1, 36.3, 115 P; 260/77.5 AM

[56] References Cited

UNITED STATES PATENTS

| | | | |
|---|---|---|---|
| 2,948,611 | 8/1960 | Barney | 96/115 P |
| 2,929,800 | 3/1960 | Hill | 260/77.5 AM |
| 2,760,863 | 8/1956 | Plambeck | 96/35.1 |
| 2,808,391 | 10/1957 | Pattison | 260/77.5 AM |

*Primary Examiner*—Norman G. Torchin
*Assistant Examiner*—John Winkelman
*Attorney*—Albert C. Doxsey and J. Hughes Powell, Jr.

[57] ABSTRACT

Soluble, sulfur-curable polyetherurethanes, reaction products of organic diisocyanates and polyalkyleneether glycols, which are chain extended with an active hydrogen bearing compound such as a nonpolymeric glycol, with either main chain unsaturation or side chains containing terminal $—CH = CH_2$ groups present in any of the active hydrogen bearing reactants, are sensitized with aromatic ketones and insolubilized by exposure to U.V. light (3,100° - 4,300° A). Plates for flexographic printing are prepared from these materials.

7 Claims, No Drawings

METHOD OF MAKING FLEXIBLE PRINTING PLATES

BACKGROUND OF THE INVENTION

Letterpress is a major method employed to produce print copy. Flexography is a branch of letterpress printing using a rotary press, flexible rubber plates and rapid drying ink. Rubber plates are presently made by molding calendered sheet against a thermoset matrix which, in turn, is usually made from a metal engraving. The area that is not to be printed may be relieved to a depth of up to about 0.035 inches and is generally relieved at least 0.015 inches. Rubber plates have good durability, but improvement is needed in half tone detail. The printing industry has need for more readily produced, lower cost etched surfaces with improved detail suitable for use as flexible printing plates.

SUMMARY OF THE INVENTION

This invention relates to a method of producing flexible, etched, printing plates from photosensitive unsaturated polyetherurethane compositions. The improved plates of this invention are produced by a process which eliminates the need of first producing a metal plate and a master plate mold. The polyetherurethane compositions, which are normally insensitive to light, are treated with aromatic ketone or other known sensitizers which make the compositions amenable to crosslinking by light. The combination of light and sensitizer crosslinks the exposed portion of the polyetherurethanes causing the polymer at those points to become harder and insoluble in solvents. Uncrosslinked portions of the plate are removed by solvent wash leaving the exposed, crosslinked areas in sharp relief as raised surfaces. Increased commercial versatility and utility are achieved by producing flexible printing plates in accordance with this invention.

The sensitizer is preferably mill mixed with the polyetherurethane. Combination of polyurethane and sensitizer in this manner eliminates the need for the customer to add the sensitizer. It can also be applied as a coating to the polymer by brushing, wiping and the like from a fluid solution or dispersion. In an alternate procedure the sensitizer is dissolved or dispersed in a fluid which is a solvent for the particular polyurethane being used. The polyurethane is then dissolved in the solvent and the composition is cast on to a nonadhering substrate in wet film form to any desired thickness. The solvent is removed leaving a dry, sensitized, flexible film from 15 to 50 mils or more thick.

Useful sensitizers include cyanines, triphenyl methane dyestuffs and dyestuffs of the benzanthrone, quinone, and anthraquinone series. Sensitizers of the aromatic ketone type include benzophenone, fluorenone, benzoin, anthraquinone and Michler's ketone. Some naphthathiazolines, pyrazolines and 4H-quinazolin-4-one are also useful. The sensitizing agent is activatable by actinic light. It must be soluble in the overall composition or capable of being uniformly dispersed therethrough. At least about 0.5 up to 20 weight parts, preferably, about 2 to 6 weight parts, of sensitizer should be added to 100 weight parts of polyurethane.

Sensitized polymeric compounds are selectively exposed to certain light as described hereinafter. Selective exposure is achieved by transmitting light through a suitable masking means, such as transparencies, photographic negatives, pattern cut-outs, and the like, which permit selective exposure by substantially screening out lightwaves in the range of 3,100° to 4,300° A in the areas not to be crosslinked. A high contrast negative, for example, has been found to be particularly suitable. The temperature at the surface being exposed should be from about 32° F up to about 200° F and ordinarily should be about 100° F to 150° F. Light sources emitting substantial amounts of light waves less than 3,100° A tend to darken the transparency. A protective glass, such as lime glass or Pyrex glass, may be placed over the transparency prior to exposure to filter out wavelengths less than 3,100° A. Although the type of light source is not critical, light sources should have some light wavelengths ranging from about 3,100° A to 4,600° A. Suitable light sources having the desired range of lightwave output include mercury arc lights (AH 6), R.S. Sunlamp (275 watts), medium or high pressure mercury arcs such as Hanovia lamp 679A and Mercury Reprographic lamp H3T7, tubular Metal Halide lamps such as MP 1500 T4/12B and MG 1500 T4/12B, high intensity fluorescent lamps, and carbon arcs such as Strong Electric lamps of the type used in the graphic arts industry. The light source should preferably have at least about 1 percent of the lightwaves produced ranging from about 3,100° A to about 4,300° A.

Required exposure times to certain light is dependent upon the intensity of the light source, the distance of the plate from the light source and the cross-linking density of the polyurethane. Exposure times should increase with increased distance between the plate and the light source and with decrease in light intensity and, accordingly, about 1 to 5 minutes exposure times are generally satisfactory. Light intensity measured at the polymeric surface should be the equivalent of about 1 watt per lineal inch of a tubular exposure lamp. Shorter exposure times of less than 1 minute may be achieved by exposing sensitized polymers to more intense ultraviolet light sources. Typical light sources spaced at varying distances from the polymeric surface are illustrated in the examples.

After the sensitized polymer has been exposed to the crosslinking effect of actinic light, the unexposed and noncrosslinked portions of the polymeric matter may be removed by solvent washing aided by a moderate mechanical brushing means. Suitable developing or washing solvents should have good solvent action on the unsaturated polyurethane and little action on the insolubilized image portion of the plate. Suitable solvents include, for example, tetrahydrofuran, methyl ethyl ketone, cyclohexanone, pyridine, dimethylformamide, dimethyl sulfoxide, and chlorinated aliphatic hydrocarbons such as trichloroethylene. A brushing means is normally used in conjunction with the washing solvents to effectively remove uncrosslinked polymeric matter. Crosslinked polymeric portions adjoining the uncrosslinked portions are substantially resistant to even vigorous brushing. Accordingly, a wide variety of brushing means may be employed. Desirable brushing means have resilient bristles ranging in stiffness from soft and flexible to semi-rigid. Alternatively, suitable washing solvents may be utilized as high pressure sprays with or without an abrasive, such as fine silica, dispersed therein.

After the uncrosslinked polymeric matter is removed by a solvating process, the etched products are dried to remove the washing solvents and may then be used in a printing process. Dried flexible printing plates may have printing ink applied thereto and are suitable for reproducing printed copy.

A variety of photosensitive polymers has been shown in the art for preparing printing negatives and rigid plates, but this invention is the first to disclose the use of normally light insensitive polyetherurethane materials containing carbon to carbon double bond unsaturation to form flexible printing plates. A polyetherurethane, chain extended with an unsaturated diol, properly sensitized, may be crosslinked or insolubilized by exposure to U.V. light (3,000° – 4,000° A). Rapid exposure times are possible, leading to an economic process for producing printing plates for flexographic printing.

The particular polyetherurethanes useful in this invention have unsaturation present in the form of double bonds in the backbone polymer chain, or, preferably, in side chains containing terminal aliphatic —CH = $CH_2$ groups. Such polymers may be prepared by reacting a polyalkyleneether glycol, such as a polytetramethyleneether glycol having a molecular weight of about 750 to 10,000 with a molar excess of an organic diisocyanate such as toluene 2,4-diisocyanate followed by reaction with a non-polymeric glycol such as a propanediol with the side chain containing terminal —CH = $CH_2$ groups present on any of the reactants. Reaction between terminal hydroxyl groups of the glycols with terminal isocyanate groups of the organic diisocyanate yields a polyurethane. Alternatively the nonpolymeric glycol may be reacted first with a molar excess of the diisocyanate and this isocyanate-terminated intermediate is then reacted with a polyalkyleneether glycol. If the nonpolymeric glycol is, for example, butenediol-1,4, the polymer unsaturation will occur in the polymer main chain.

The polyalkyleneether glycols useful in the preparation of the polyetherurethane polymers which may be cured according to the process of the present invention are compounds which have the general formula $H(OR)_nOH$, wherein R is an alkylene radical and $n$ is an integer sufficiently large that the glycol has a molecular weight of at least 750. Not all the alkylene radicals present need be the same. These glycols may be derived by the polymerization of cyclic ethers, such as alkyleneoxides or dioxolane or by the condensation of glycols. A preferred polyalkyleneether glycol is polytetramethyleneether glycol, also known as polybutyleneether glycol. Polyethyleneether glycol, polypropyleneether glycol, 1,2-polydimethyleneether glycol and polydecamethyleneether glycol are other typical representatives of this class.

Any of a wide variety of organic diisocyanates may be employed to react with the glycols to prepare these polyurethane polymers, including aromatic, aliphatic and cycloaliphatic diisocyanates and combinations of these types. Mixtures of two or more organic diisocyanates may be used. Representative compounds include toluene-2,4-diisocyanate, m-phenylene diisocyanate, 4-chloro-1,3-phenylene diisocyanate, 4-4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclo-hexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. Compounds such as toluene-2,4-diisocyanate in which the two isocyanate groups differ in reactivity are particularly desirable.

The non-polymeric glycols which are used in the preparation of these polyurethane polymers are compounds which should have molecular weights below about 200. In general, it is desirable that side chains containing terminal aliphatic $-CH=CH_2$ groups be introduced into the polyurethane polymer by means of this non-polymeric glycol reactant. Representative compounds which may be used include 3-allyloxy-1,5-pentanediol, 3-(allyloxy)-1,2-propanediol, 2-[(allyloxy) methyl]-2-methyl-1,3-propanediol, 2,2'-(4-allyl-m-phenylenedioxy)-diethanol, 3-(o-allylphenoxy)-1,2-propanediol, 2-[(allyloxy)ethyl]-1,3-propanediol, 2-[(allyloxy)ethyl]-2-methyl-1, 3-propanediol, 2-methyl-2-[(10-undecenyloxy)-methyl[-1,3-propanediol, 2,2'-(allylimino)-diethanol, 2-[(allyloxy)methyl]-1, 3-propanediol, 3-(4-allyl-2-methoxyphenoxy)-1,2-propanediol. Materials such as 1,4-butenediol and 1,6-hexenediol will introduce unsaturation in the backbone chain of the polyetherurethane produced.

As has been mentioned above, the polyurethane polymers which are cured according to the process of the present invention may have side chains containing terminal $-CH=CH_2$ groups or may show double bond unsaturation in the main polymer chain. These double bonds serve as potential cross-linking sites and it is by means of them that the polymers may be crosslinked by the actinic light employed in this invention. There should be at least one of these double bonds present for every 8,000 units of molecular weight of polymer in order to assure the presence of a sufficient number of sites so that the polymer can be effectively crosslinked. It is to be understood that there may be more double bonds present and that the number of double bonds may be in excess of the number actually utilized in the cross-linking step. On the average, it is preferred to have not more than about one double bond per 500 units of molecular weight of polymer. The unsaturated polyetherurethanes have been found to form sheet stock for flexible printing plates that requires no special treatment to harden the surface for use.

To produce flexible printing plates, the polymer is formed into flat sheets by a suitable sheet forming process such as calendering. Sheets formed for printing plates should have uniform thickness with a maximum variance in sheet thickness of about ± 0.002 inch preferably, ± 0.005 inch for use in fine detailed printing. For producing printing plates the flat sheets may be used alone or as a face ply on a suitable backing material.

The surface of the plate is exposed to light through a contacted process transparency, e.g. a process positive or negative (consisting solely of opaque and transparent areas and where the opaque areas are of the same optical density, the so-called line or half-tone negative or positive). The light induces the reaction, which insolubilizes the areas of the surface beneath the transparent portions of the image, while the areas beneath the opaque portions of the image remain soluble. The soluble areas of the surface are then removed by a developer, and the remaining insoluble raised portions of the film can serve as a resist image, while the exposed base material is etched, forming a relief plate. The plate can be inked and used as a relief printing plate directly in the customary manner.

The thickness of the photosensitive layer is a direct function of the thickness desired in the relief image and this will depend on the subject being reproduced and particularly on the extent of the non-printing areas. In the case of half-tones the screen used is also a factor. Generally, the thickness of the photosensitive layer will vary from about 0.001 mm. to about 7 mm. Layers ranging from about 0.001 to about 0.70 mm. in thickness will be used for half-tone plates. Layers ranging from about 0.25 to about 1.50 mm. in thickness will be used for the majority of letterpress printing plates, including those wherein half-tone and line images are to be combined.

The solvent liquid used for washing or "developing" the printing plates made from the photosensitive composition must be selected with care, since it should have good solvent action on the unexposed areas, yet have little action on the image or upon the base material, any non-halation layer, or the anchor layer with which the photosensitive composition may be anchored to the support.

The photochemically insolubilizable compositions are suitable for other purposes in addition to the printing uses described above, e.g. as ornamental plaques or for producing ornamental effects; as patterns for automatic engraving machines, foundry molds, cutting and stamping dies, name stamps, relief maps for braille, as rapid cure coatings, e.g. on film base; as variable area sound tracks on film; in the preparation of printed circuits; and in the preparation of the other plastic articles.

The foregoing description is for clearness in understanding of the process of this invention and modifications thereof will be obvious to those skilled in the art. The following examples and discussion will further illustrate this invention. All parts indicated are by weight unless otherwise noted.

DETAILED DESCRIPTION OF THE INVENTION

EXAMPLE 1

A sulfur curable, millable polyetherurethane gum (A) is prepared by reacting 80.0 parts of 3-(allyloxy)-1,2-propanediol with 310.0 parts toluene-2,4-diisocyanate at 80° C for 3.5 hours. One hundred parts of this isocyanate terminated prepolymer is then mixed with 300 parts polytetramethyleneether glycol (mol. wt. 1,025) and heated at 85° C for 20 hours. This polymer has an average molecular weight of 2,600 per side chain curing site, cured tensile is 4,500 psi, tear strength 450 lb./inch, compression set 23 percent and Shore A durometer hardness 72. The material is resilient and resistant to ozone and weathering.

The following composition is prepared by mill mixing at 125° F for 20 minutes, sheeted out to a 30 mil thickness, pressed between cellophane sheets at 200° F and 5,000 psi and cooled in the press.

| Material | Parts |
|---|---|
| Polyetherurethane (A) | 100 |
| Benzophenone | 10 |

The pressed composition is mounted directly below a photographic negative and 6 inches from a carbon arc light source for 1 minute. The exposed sheet is washed for 1 minute in a 3/1 mixture of methylethylketone/tetrahydrofuran. A sharp image results with a relief of 15–20 mils. The experiment is repeated using a 275 watt RS sunlamp as the light source and varying the exposure time from 60 minutes down to 1 minute. In each instance sharp relief depth of 10–15 mils is observed after washing for 1 minute. When dried and contacted with an ink pad, the raised portions of the plate take on ink while the portions where unexposed polymer has been dissolved receive no ink. The image of the photographic negative is then readily transferred from the flexible plate to a sheet of paper with excellent detail.

EXAMPLE 2

A sulfur curable random polymerized polyalkeneether glycol polyurethane is prepared by mixing the following reactants.

| Material | Mol Parts |
|---|---|
| Polytetramethyleneether glycol (M.W.1,000) | 1.00 |
| 3-(allyloxy)-1,2-propanediol | 0.3 |
| Bis-diphenylmethane diisocyanate | 1.30 |

The polytetramethyleneether glycol is heated to 170° C, 3-(allyloxy)-1,2-propanediol is added and the diisocyanate is quickly added over 30 seconds. The reaction temperature rises to 225° C as the reaction is run for 4½ minutes after which the mix is poured into a Teflon lined pan and cooled to room temperature. This polymer has a DSV of 0.608 (0.4g./100 ml. dimethylformamide at 25° C), $T_1$ of -40° C and $T_2$ of +41° C.

Ten grams of the unsaturated polymer is dissolved in 100 ml. tetrahydrofuran containing 0.5 g. benzophenone. A film is cast and dried at room temperature, forming a flexible plate 25 mls. thick when dry. This plate is exposed 3 minutes at 6 inches from an RS 275 watt sunlamp through a photographic negative. The exposed plate is washed in 3/1 methylethyl ketone/tetrahydrofuran for 1 minute. Exposed, crosslinked portions have a relief height of 10 – 15 mils. The plate takes ink from a pad on the exposed portions and the inked image is formed on paper print stock in sharp detail. When the exposed plate is washed for longer times, even deeper relief is obtained. Depths to the bottom of the plate, 25 mils, can be achieved.

EXAMPLE 3

A sulfur curable random polymerized polyalkeneether glycol polyurethane with backbone unsaturation is prepared by mixing the following reactants.

| Material | Mol Parts |
|---|---|
| Polytetramethyleneether glycol (M.W. 1000) | 1.00 |
| 1,4-butenediol | 0.25 |
| Bis-diphenylmethane diisocyanate | 1.25 |

The polytetramethyleneether glycol is heated to 170° C, 1,4-butenediol is added and the diisocyanate is quickly added over 30 seconds. The reaction temperature rises to 225° C as the reaction is run for 4½ minutes after which the mix is poured into a Teflon lined pan and cooled to room temperature. This polymer has a DSV of 0.981 (0.4g./100 ml. dimethylformamide at 25° C), $T_1$ of −40° C and $T_2$ of +91° C.

Ten grams of the unsaturated polymer is dissolved in 125 ml. tetrahydrofuran containing 0.5 g. benzophenone. A film is cast and dried at room temperature, forming a flexible plate 25 mls. thick. This plate is exposed 15 minutes at 6 inches from an RS 275 watt sunlamp through a photographic negative. The exposed plate is washed in 1/1 methylethyl ketone/tetrahydrofuran for 1 minute.

The exposed, crosslinked areas of the polymer have a relief height of 10 – 15 mils. Duplicate results are obtained when the exposure time is cut to 5 minutes. When wash time is lengthened to 2 minutes, the relief is sharp and the relief depth is 20 – 25 mils.

What is claimed is:

1. A process for the production of an improved flexible printing plate comprising providing a homogeneous mixture consisting essentially of (A) solvent soluble polyetherurethane containing a unit of carbon to carbon double bond unsaturation for every 500 to 8,000 units of polymer molecular weight and (B) a photosensitizing agent, shaping said mixture to form a flat plate, exposing said plate through a masking transparency to actinic light, washing said exposed plate in solvent for said polymer thereby dissolving the unexposed portions of the surface of said plate.

2. The process of claim 1 wherein said polyetherurethane A is obtained by reacting a polyalkyleneether glycol, an aromatic diisocyanate and a nonpolymeric diol chain extender, said diol bearing carbon to carbon unsaturation.

3. The process of claim 2 wherein the said diol is 3-(allyloxy)-1,2-propanediol.

4. The process of claim 2 wherein the said diol is 1,4-butenediol.

5. A process for the production of an improved flexible printing plate for letterpress printing comprising providing a homogeneous mixture consisting essentially of (A) a solvent soluble polyetherurethane containing a unit of carbon to carbon double bond unsaturation in the polymer backbone chain or in a side chain to the backbone chain for every 500 to 8,000 units of polymer molecular weight and (B) a photosensitizing agent, shaping said mixture to form a flat plate, exposing said plate through a masking transparency to actinic light of 3,100° A – 4,300° A, washing said exposed plate in solvent for said polymer thereby dissolving unexposed portions of the surface of said plate to a depth of 10 – 25 mils.

6. The process of claim 5 wherein said photosensitizing agent is selected from the group consisting of aromatic ketones, naphthathiazolines, pyrazolines and cyanine dyes.

7. An etched rubber product produced by the process of claim 1.

* * * * *